(12) United States Patent
McMahon et al.

(10) Patent No.: US 9,656,608 B2
(45) Date of Patent: *May 23, 2017

(54) DRIVER ASSIST SYSTEM FOR VEHICLE

(71) Applicant: MAGNA ELECTRONICS INC., Auburn Hills, MI (US)

(72) Inventors: Martha A. McMahon, Ann Arbor, MI (US); Troy O. Cooprider, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,645

(22) Filed: Jun. 13, 2016

(65) Prior Publication Data

US 2016/0280137 A1 Sep. 29, 2016

Related U.S. Application Data

(63) Continuation of application No. 14/942,087, filed on Nov. 16, 2015, now Pat. No. 9,376,060, which is a
(Continued)

(51) Int. Cl.
*H04N 7/18* (2006.01)
*B60R 1/00* (2006.01)
(Continued)

(52) U.S. Cl.
CPC ............... *B60R 1/00* (2013.01); *B60K 35/00* (2013.01); *B60Q 1/08* (2013.01); *B60Q 9/00* (2013.01);
(Continued)

(58) Field of Classification Search
CPC .......... H04N 21/42202; H04N 21/422; H04N 21/4223; G05D 1/00; G05D 1/0038; G05D 1/0044; G05D 1/0033
See application file for complete search history.

(56) References Cited

U.S. PATENT DOCUMENTS 2,632,040 A 3/1953 Rabinow
2,827,594 A 3/1953 Rabinow
(Continued)

FOREIGN PATENT DOCUMENTS

DE 2931368 2/1981
DE 3248511 7/1984
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Justin Shepard
(74) *Attorney, Agent, or Firm* — Gardner, Linn, Burkhart & Flory, LLP

(57) ABSTRACT

A vehicular driver assist system suitable for use in a vehicle includes a video processor module receiving and processing image data provided by a plurality of video sensors and sensor data provided by a plurality of non-video sensors. The video processor module communicates with other vehicle systems via a vehicle bus. The received image data may be processed at the video processor module to generate a synthesized image, which may be output from the video processor module for display by a single display screen of a display device that is viewable by a driver of the vehicle. An object external to the vehicle may be detected, at least in part, via processing of image data at the video processor module. Responsive at least in part to processing of image data and sensor data at the video processor module, a driver assistance system of the vehicle is controlled.

46 Claims, 2 Drawing Sheets

Related U.S. Application Data continuation of application No. 13/800,677, filed on Mar. 13, 2013, now Pat. No. 9,191,574, which is a continuation of application No. 12/708,079, filed on Feb. 18, 2010, now Pat. No. 8,405,725, which is a continuation of application No. 10/209,181, filed on Jul. 31, 2002, now Pat. No. 7,697,027.

(60) Provisional application No. 60/309,023, filed on Jul. 31, 2001.

(51) Int. Cl.

| | | |
|---|---|---|
| *H04N 21/422* | (2011.01) | |
| *H04N 21/4223* | (2011.01) | |
| *G05D 1/00* | (2006.01) | |
| *H04N 5/232* | (2006.01) | |
| *H04N 5/374* | (2011.01) | |
| *B60K 35/00* | (2006.01) | |
| *B60Q 1/08* | (2006.01) | |
| *B60Q 9/00* | (2006.01) | |
| *B60R 16/023* | (2006.01) | |
| *B60W 30/14* | (2006.01) | |
| *G01S 13/86* | (2006.01) | |

(52) U.S. Cl.
CPC ............ *B60Q 9/008* (2013.01); *B60R 16/023* (2013.01); *B60W 30/143* (2013.01); *G01S 13/867* (2013.01); *G05D 1/00* (2013.01); *G05D 1/0033* (2013.01); *G05D 1/0038* (2013.01); *G05D 1/0044* (2013.01); *H04N 5/23238* (2013.01); *H04N 5/374* (2013.01); *H04N 7/181* (2013.01); *H04N 21/422* (2013.01); *H04N 21/4223* (2013.01); *H04N 21/42202* (2013.01); *B60R 2300/105* (2013.01); *B60R 2300/303* (2013.01); *B60R 2300/304* (2013.01)

(56) References Cited

U.S. PATENT DOCUMENTS

| | | | |
|---|---|---|---|
| 3,947,095 A | 3/1976 | Moultrie |
| 3,985,424 A | 10/1976 | Steinacher |
| 4,037,134 A | 7/1977 | Loper |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,975 A | 2/1987 | Meitzler et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |

(56) References Cited

U.S. PATENT DOCUMENTS

| | | |
|---|---|---|
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,680,123 A | 10/1997 | Lee |
| 5,680,313 A | 10/1997 | Whittaker et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,722 A | 7/1998 | Buhler et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |
| 5,912,980 A | 6/1999 | Hunke |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |

(56) References Cited

U.S. PATENT DOCUMENTS

| | | |
|---|---|---|
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,963,749 A | 10/1999 | Nicholson |
| 5,964,822 A | 10/1999 | Alland et al. |
| 5,971,552 A | 10/1999 | O'Farrell et al. |
| 5,982,544 A | 11/1999 | Ogata |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,020,931 A | 2/2000 | Bilbrey et al. |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,097,023 A | 8/2000 | Schofield et al. |
| 6,097,024 A | 8/2000 | Stam et al. |
| 6,115,651 A | 9/2000 | Cruz |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,151,539 A | 11/2000 | Bergholz et al. |
| 6,161,066 A | 12/2000 | Wright et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,396,408 B2 | 5/2002 | Drummond et al. |
| 6,411,204 B1 | 6/2002 | Bloomfield et al. |
| 6,411,328 B1 | 6/2002 | Franke et al. |
| 6,414,712 B1 | 7/2002 | Wanielik et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,590,719 B2 | 7/2003 | Bos |
| 6,593,565 B2 | 7/2003 | Heslin et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,734,896 B2 | 5/2004 | Nobori et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,801,638 B1 | 10/2004 | Janssen et al. |
| 6,802,617 B2 | 10/2004 | Schofield et al. |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,917,693 B1 | 7/2005 | Kiridena et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,035,433 B1 | 4/2006 | Mihara et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |

(56) References Cited

U.S. PATENT DOCUMENTS

| | | |
|---|---|---|
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,190,882 B2 | 3/2007 | Gammenthaler |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,605,856 B2 | 10/2009 | Imoto |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,697,027 B2 | 4/2010 | McMahon et al. |
| 7,720,580 B2 | 5/2010 | Higgins-Luthman |
| 7,755,668 B1 | 7/2010 | Johnston et al. |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,095,310 B2 | 1/2012 | Taylor et al. |
| 8,098,142 B2 | 1/2012 | Schofield et al. |
| 8,164,628 B2 | 4/2012 | Stein et al. |
| 8,203,440 B2 | 6/2012 | Schofield et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,314,689 B2 | 11/2012 | Schofield et al. |
| 8,324,552 B2 | 12/2012 | Schofield et al. |
| 8,378,851 B2 | 2/2013 | Stein et al. |
| 8,386,114 B2 | 2/2013 | Higgins-Luthman |
| 8,405,725 B2 | 3/2013 | McMahon et al. |
| 8,452,055 B2 | 5/2013 | Stein et al. |
| 8,553,088 B2 | 10/2013 | Stein et al. |
| 9,187,028 B2 | 11/2015 | Higgins-Luthman |
| 9,376,060 B2 | 6/2016 | McMahon et al. |
| 2002/0003571 A1 | 1/2002 | Schofield et al. |
| 2002/0005778 A1 | 1/2002 | Breed |
| 2002/0015047 A1 | 2/2002 | Okada et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2013/0141580 A1 | 6/2013 | Stein et al. |
| 2013/0147957 A1 | 6/2013 | Stein |

FOREIGN PATENT DOCUMENTS

| | | |
|---|---|---|
| DE | 4107965 | 9/1991 |
| DE | 4124654 | 1/1993 |
| EP | 0202460 | 11/1986 |
| EP | 0830267 | 3/1988 |
| EP | 0353200 | 1/1990 |
| EP | 0527665 | 2/1991 |
| EP | 0416222 | 3/1991 |
| EP | 0426503 | 5/1991 |
| EP | 0450553 | 10/1991 |
| EP | 0492591 | 7/1992 |
| EP | 0513476 | 11/1992 |
| EP | 0361914 | 2/1993 |
| EP | 0605045 | 7/1994 |
| EP | 0640903 | 3/1995 |
| EP | 0697641 | 2/1996 |
| EP | 0788947 | 8/1997 |
| EP | 1074430 | 2/2001 |
| EP | 1115250 | 7/2001 |
| FR | 2241085 | 3/1975 |
| FR | 2585991 | 2/1987 |
| FR | 2673499 | 9/1992 |
| GB | 934037 | 8/1963 |
| GB | 2137573 | 10/1984 |
| GB | 2244187 | 11/1991 |
| GB | 2327823 | 2/1999 |
| JP | 5539843 | 3/1980 |
| JP | S5539843 | 3/1980 |
| JP | S58110334 | 6/1983 |
| JP | 58209635 | 12/1983 |
| JP | 59114139 | 7/1984 |
| JP | 6079889 | 5/1985 |
| JP | 6080953 | 5/1985 |
| JP | S6216073 | 4/1987 |
| JP | 6272245 | 5/1987 |
| JP | 62122487 | 6/1987 |
| JP | 62122844 | 6/1987 |
| JP | S62-131837 | 6/1987 |
| JP | 6414700 | 1/1989 |
| JP | 01123587 | 5/1989 |

(56) References Cited

FOREIGN PATENT DOCUMENTS

| | | |
|---|---|---|
| JP | H1168538 | 7/1989 |
| JP | 361192 | 3/1991 |
| JP | 03099952 | 4/1991 |
| JP | 04239400 | 11/1991 |
| JP | 04114587 | 4/1992 |
| JP | H04-127280 | 4/1992 |
| JP | 3151829 | 1/1993 |
| JP | 0577657 | 3/1993 |
| JP | 05050883 | 3/1993 |
| JP | 05213113 | 8/1993 |
| JP | 06107035 | 4/1994 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 10076881 | 3/1998 |
| JP | 200274339 | 3/2002 |
| JP | 2003-083742 | 3/2003 |
| JP | 20041658 | 1/2004 |
| WO | WO9419212 | 2/1994 |
| WO | WO9621581 | 7/1996 |
| WO | WO9638319 | 12/1996 |

OTHER PUBLICATIONS

Behringer et al., "Simultaneous Estimation of Pitch Angle and Lane Width from the Video Image of a Marked Road," pp. 966-973, Sep. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Brown, A Survey of Image Registration Techniques, vol. 24, ACM Computing Surveys, pp. 325-376, 1992.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Burt et al., A Multiresolution Spline with Application to Image Mosaics, ACM Transactions on Graphics, vol. 2. No. 4, pp. 217-236, Oct. 1983.
Cucchiara et al., Vehicle Detection under Day and Night Illumination, 1999.
Dickmanns et al., "A Curvature-based Scheme for Improving Road Vehicle Guidance by Computer Vision," University of Bundeswehr München, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al.; "An integrated spatio-temporal approach to automatic visual guidance of autonomous vehicles," IEEE Transactions on Systems, Man, and Cybernetics, vol. 20, No. 6, Nov./Dec. 1990.
Dickmanns, "4-D dynamic vision for intelligent motion control", Universitat der Bundeswehr Munich, 1991.
Donnelly Panoramic Vision™ on Renault Talisman Concept Car At Frankfort Motor Show, PR Newswire, Frankfort, Germany Sep. 10, 2001.
Ericsson Press Release—Jun. 5, 2000.
Franke et al., "Autonomous driving approaches downtown", Intelligent Systems and Their Applications, IEEE 13 (6), 40-48, Nov./Dec. 1999.
Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.
Honda Worldwide, "Honda Announces a Full Model Change for the Inspire." Jun. 18, 2003.
IEEE 100—The Authoritative Dictionary of IEEE Standards Terms, $7^{th}$ Ed. (2000).
Japanese Article "Television Image Engineering Handbook, The Institute of Television Engineers of Japan", Jan. 17, 1981.
Kan et al., "Model-based vehicle tracking from image sequences with an application to road surveillance," Purdue University, XP000630885, vol. 35, No. 6, Jun. 1996.
Kastrinaki et al., "A survey of video processing techniques for traffic applications".
Kluge et al., "Representation and Recovery of Road Geometry in YARF," Carnegie Mellon University, pp. 114-119.
Koller et al., "Binocular Stereopsis and Lane Marker Flow for Vehicle Navigation: Lateral and Longitudinal Control," University of California, Mar. 24, 1994.
Kuhnert, "A vision system for real time road and object recognition for vehicle guidance," in Proc. SPIE Mobile Robot Conf, Cambridge, MA, Oct. 1986, pp. 267-272.
Malik et al., "A Machine Vision Based System for Guiding Lane-change Maneuvers," Sep. 1995.
Mei Chen et al., AURORA: A Vision-Based Roadway Departure Warning System, The Robotics Institute, Carnegie Mellon University, published Aug. 9, 1995.
Morgan et al., "Road edge tracking for robot road following: a real-time implementation," vol. 8, No. 3, Aug. 1990.
Nathan, Digital Video Data Handling, NASA JPL Tech Report 32-877, Pasadena, CA, Jan. 5, 1966.
Parker (ed.), McGraw-Hill Dictionary of Scientific and Technical Terms Fifth Edition (1993).
Philomin et al., "Pedestrain Tracking from a Moving Vehicle".
Porter et al., "Compositing Digital Images," Computer Graphics (Proc. Siggraph), vol. 18, No. 3, pp. 253-259, Jul. 1984.
Pratt, "Digital Image Processing, Passage—ED.3", John Wiley & Sons, US, Jan. 1, 2001, pp. 657-659, XP002529771.
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review".
Szeliski, Image Mosaicing for Tele-Reality Applications, DEC Cambridge Research Laboratory, CRL 94/2, May 1994.
Tokimaru et al., "CMOS Rear-View TV System with CCD Camera", National Technical Report vol. 34, No. 3, pp. 329-336, Jun. 1988 (Japan).
Toyota Motor Corporation, "Present and future of safety technology development at Toyota." 2004.
Tsugawa et al., "An automobile with artificial intelligence," in Proc. Sixth IJCAI, 1979.
Turk et al., "VITS-A Vision System for Autonomous Land Vehicle Navigation," IEEE, 1988.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vellacott, Oliver, "CMOS in Camera," IEE Review, pp. 111-114 (May 1994).

(56) References Cited

OTHER PUBLICATIONS

Vlacic et al. (Eds), "Intelligent Vehicle Tecnologies, Theory and Applications", Society of Automotive Engineers Inc., edited by SAE International, 2001.
Wang et al., CMOS Video Cameras, article, 1991, 4 pages, University of Edinburgh, UK.
Wolberg, "A Two-Pass Mesh Warping Implementation of Morphing," Dr. Dobb's Journal, No. 202, Jul. 1993.
Wolberg, Digital Image Warping, IEEE Computer Society Press, 1990.
Zheng et al., "An Adaptive System for Traffic Sign Recognition," IEEE Proceedings of the Intelligent Vehicles '94 Symposium, pp. 165-170 (Oct. 1994).

DRIVER ASSIST SYSTEM FOR VEHICLE

CROSS-REFERENCE TO RELATED APPLICATIONS

This application is a continuation of U.S. patent application Ser. No. 14/942,087, filed Nov. 16, 2015, now U.S. Pat. No. 9,376,060, which is a continuation of U.S. patent application Ser. No. 13/800,677, filed Mar. 13, 2013, now U.S. Pat. No. 9,191,574, which is a continuation of U.S. patent application Ser. No. 12/708,079, filed Feb. 18, 2010, now U.S. Pat. No. 8,405,725, which is a continuation of U.S. patent application Ser. No. 10/209,181, filed Jul. 31, 2002, now U.S. Pat. No. 7,697,027, which claims priority from U.S. provisional patent application Ser. No. 60/309,023, filed on Jul. 31, 2001, the disclosure of which is hereby incorporated herein by reference in its entirety.

FIELD OF THE INVENTION

This invention is directed to a video processor made for a vehicular video system and, more particularly, to a single electronic module which processes images from multiple image capture devices, such as CMOS video cameras, mounted throughout the interior and/or exterior of a vehicle, such as an automobile.

BACKGROUND THE INVENTION

It is known to use multiple video cameras on a vehicle to capture images both interior to the vehicle and exterior to the vehicle. It is also known to process the image outputs of such cameras by a variety of controls in order to display said images to a driver or another occupant of the vehicle, or to utilize the output of a camera in order to generate a control signal for a vehicular accessory, such as a headlamp or windshield wiper. As the number and complexity of camera-based accessories and features grows in a vehicle, there is a need to economically and efficiently process the multiple outputs from a plurality of camera and other sensors in order to perform a plurality of image displays and control functions.

SUMMARY OF THE INVENTION

The present invention is directed to a Video Processor Module (VPM) that is adapted to accept input from several vehicular cameras and optionally from other non-video devices and sensors in or on the vehicle and to process the image outputs therefrom in order to provide a variety of functions and controls. The VPM is preferably further adapted to interface with other vehicle modules via interfaces to the vehicle communication buses, such as via a CAN bus and/or a LIN bus.

A vehicle-based video processor module for a video system of a vehicle, according to an aspect of the invention, includes a video processor circuit, a plurality of electronic sensor interfaces that are operable to receive image output data from a plurality of imaging devices and at least one electronic vehicle interface that is operable to communicate with a vehicle communication bus. The video processor circuit is operable to process the image output data from the plurality of imaging devices into a single database in a standard format.

A vehicle-based video processor module for a video system of a vehicle, according to an aspect of the invention, includes a video processor circuit, a plurality of electronic sensor interfaces that are operable to receive image output data from a plurality of imaging devices and at least one electronic vehicle interface that is operable to communicate with a vehicle communication bus. The video processor circuit is operable to process the image output data from the plurality of imaging devices and to enhance the image output data.

These and other objects, advantages and features of this invention will become apparent upon review of the following specification in conjunction with the drawings.

DESCRIPTION OF THE PREFERRED EMBODIMENT

Figure 1:
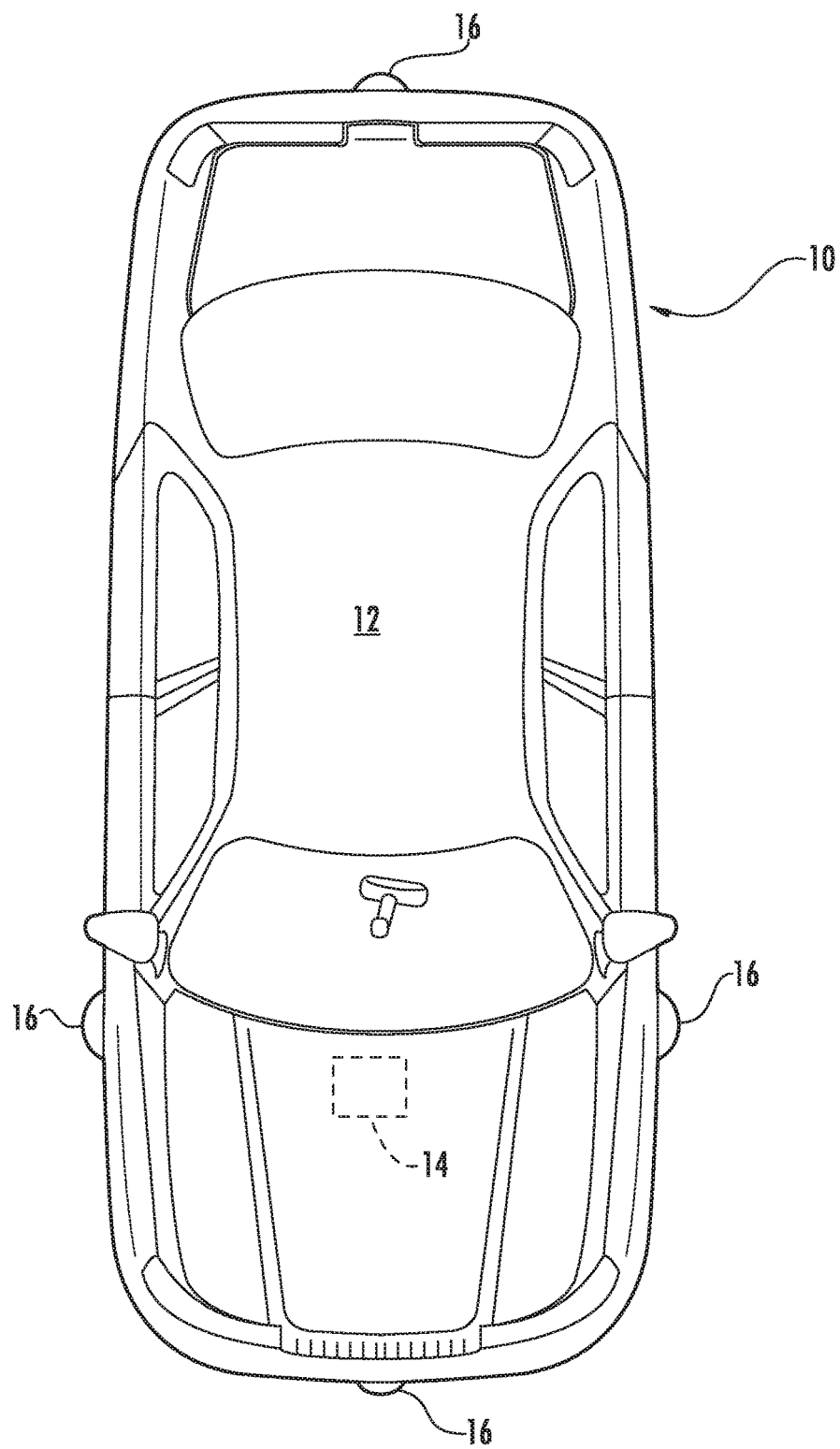
FIG. 1 is a top plan view of a vehicle outfitted with a vehicular video system, according to the invention.

Referring now to the drawings and the illustrative embodiments depicted therein, a vehicle 10 is illustrated in FIG. 1 having a vehicular video system 12, according to the invention. Vehicular video system 12 includes video processor module (VPM) 14, which receives input from a plurality of sensors, generally shown at 16. VPM 14 processes the output data from the plurality of devices and enhances the image output data. Sensors 16 may be imaging devices, such as vehicular cameras, as well as non-imaging devices. An example of a mix of sensors 16 that may be used in vehicular video system 12 includes imaging sensors, forward-facing imaging sensors, rearward-facing imaging sensors, left-side-facing imaging sensors, right-side-imaging sensors, inward-facing cabin-imaging sensors, and the like. Non-video sensors may include a near infrared sensor, a far infrared sensor, a radar sensor such as a Doppler radar sensor, a sonar sensor, a thermal sensor, a night vision sensor such as a multi-pixel bolometer and any other sensors which establish the presence, distance to, position and/or speed of an object. A Doppler radar sensor or side-facing camera may be mounted at an exterior mirror assembly. A forward-facing camera may be mounted at an interior mirror assembly of the vehicle that performs a headlamp control and/or windshield wiper control function. A side lane blind spot and/or lane change system may be provided and the VPM may be adapted to accept data from a variety of other non-video sensors to enhance performance in all visibility situations, such as when driving in fog or other low visibility conditions.

Figure 2:
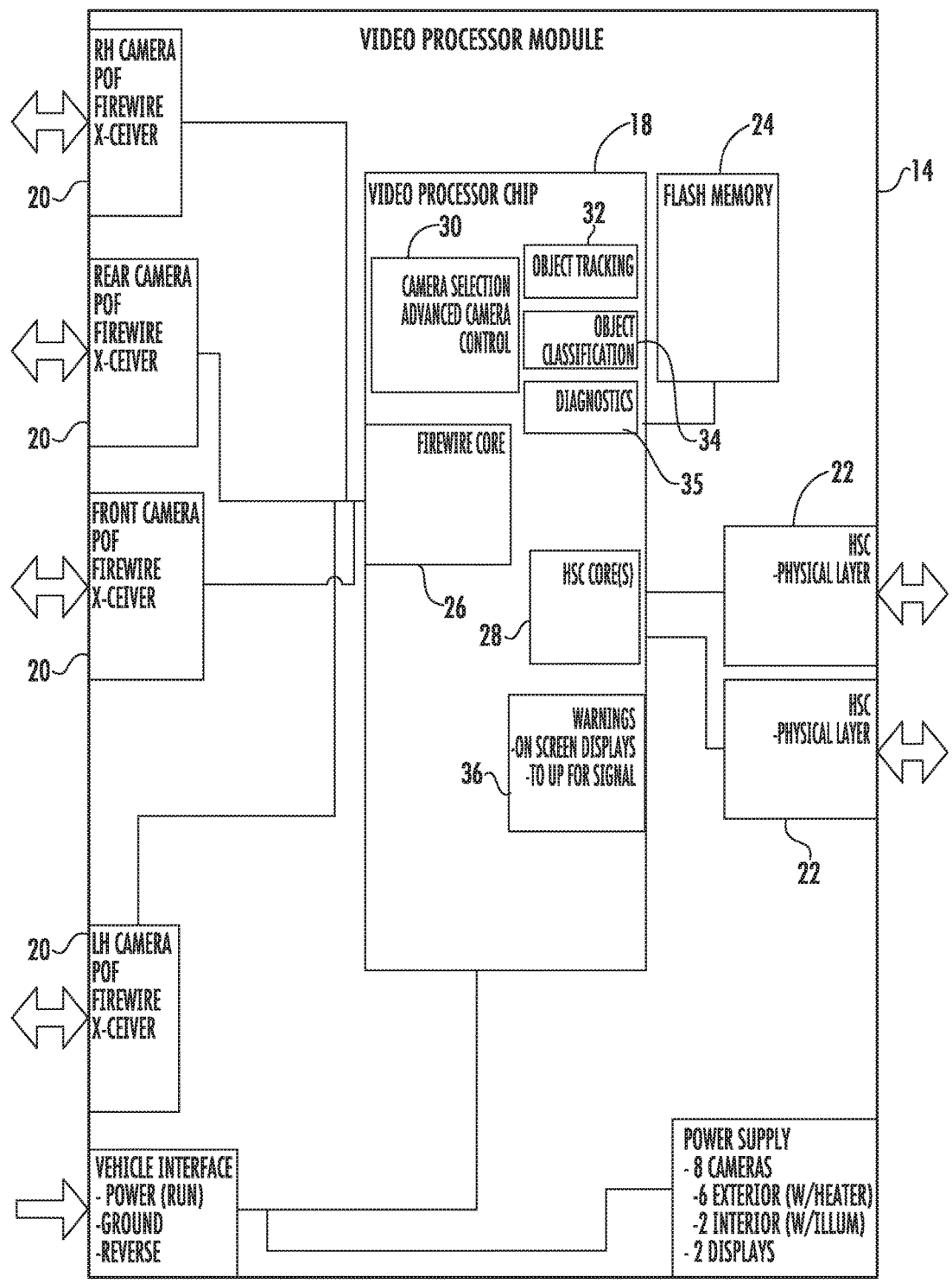
FIG. 2 is a block diagram of a video processor module, according to the invention.

Video processor module 14 includes a video processor circuit 18 and a plurality of electronic sensor interfaces 20 for receiving data from a plurality of sensors 16. In the embodiment illustrated in FIG. 2, electronic interfaces 20 are illustrated as receiving image data output respectively from right-hand-facing and left-hand-facing side cameras, a front-facing camera and a rear-facing camera. The image data may be transmitted across a robust transmission means, such as a fiber-optic cable or a high-density wireless link, or the like. However, electronic interfaces 20 are capable of receiving data from non-imaging sensors as well. Electronic interfaces 20 may be utilized, J1394 Firewire protocol, NTSC protocol, or other standard protocol. Video processor module 14 includes at least one electronic vehicle interface 22 which is operative to interface with a vehicle bus, such as a CAN bus, a LIN bus, or the like.

Video processor circuit 18 includes a core 26 to exchange data with electronic sensor interfaces 20, and a core 28 to exchange data with electronic vehicle interfaces 22. A memory device 24 stores various data such as settings. Video processor circuit 18 includes a camera selection and advanced camera control section 30 for controlling the individual sensor devices and for integrating data from the plurality of sensors, such as by fusing or combining image data from multiple imaging sensors and data from non-imaging sensors. This combined or fused data is preprocessed into a single database in a standard format. Video processor circuit 18 further includes an object-tracking section 32 for tracking objects that are identified and classified by an object classification section 34. Video processor circuit 18 further includes a display section 36 which generates on-screen display signals and a diagnostic section 35 for performing diagnostics.

Having described the components of vehicular video system 12 and their operation, examples of various functions that can be supported with this vehicular video system will be set forth. One set of functions includes features for viewing of a displayed image. Video processor module 14 may be capable of merging of images from a plurality of imaging sensors 16 to provide a panoramic view, which exceeds the field of view of a single camera or allows the image to "wrap" around the vehicle. Video processor module 14 may be further capable of electronic elimination of distortions created by wide-angle lenses used with sensors 16. Video processor module 14 may be capable of superimposing graphics onto a displayed image to provide additional information to the observer.

Another set of functions includes features for sensing using an electronic image. Video processor module 14 may be programmed to be capable of detection with object position, speed and classification to support one or more of the following features:

Blind spot detection
Lane change aid
Adaptive speed control
Reverse aid warning
Advanced crash warning Video processor module 14 may be programmed to be capable of detecting the location of a lane on a road in conjunction with an imaging sensor 16. This capability can support a lane departure-warning feature or autonomous vehicle control. Video processor module 14 may use imaging sensors to establish ambient lighting and detect other vehicles for automatic control of the headlamps (on/off) and high/low beams. Video processor module 14 may have the capability to use imaging sensors to establish ambient lighting and vehicle headlamps for automatic control of electrochromic mirrors. Video processor module 14 may have the capability to detect the presence, position and size of occupants inside the vehicle. Video processor module 14 may have the capability to stabilize an image for viewing or use in sensing algorithms. It should be understood that the listed features and functions are illustrative only. Which of the particular ones that are used for a particular vehicular application may differ from those used for other vehicular applications. Additionally, other features and functions may be identified for video processor module 14 by the skilled artisan.

VPM 14 can be utilized in a variety of applications such as disclosed in commonly assigned U.S. Pat. Nos. 5,670,935; 5,949,331; 6,222,447; 6,201,642; 6,097,023; 5,715,093; 5,796,094 and 5,877,897 and commonly assigned patent application Ser. No. 09/793,002 filed Feb. 26, 2001, now U.S. Pat. No. 6,690,268, Ser. No. 09/372,915, filed Aug. 12, 1999, now U.S. Pat. No. 6,396,397, Ser. No. 09/767,939, filed Jan. 23, 2001, now U.S. Pat. No. 6,590,719, Ser. No. 09/776,625, filed Feb. 5, 2001, now U.S. Pat. No. 6,611,202, Ser. No. 09/799,993, filed Mar. 6, 2001, now U.S. Pat. No. 6,538,827, Ser. No. 09/493,522, filed Jan. 28, 2000, now U.S. Pat. No. 6,426,492, Ser. No. 09/199,907, filed Nov. 25, 1998, now U.S. Pat. No. 6,717,610, Ser. No. 08/952,026, filed Nov. 19, 1997, now U.S. Pat. No. 6,498,620, and Ser. No. 09/227,344, filed Jan. 8, 1999, now U.S. Pat. No. 6,302,545, International Publication No. WO 96/38319, published Dec. 5, 1996, and International Publication No. WO 99/23828, published May 14, 1999, the disclosures of which are collectively incorporated herein by reference.

For example, VPM 14 can be utilized in a vehicle equipped with a side object detection system utilizing stereoscopic imaging from cameras located in the driver-side exterior mirror assembly and/or in the passenger-side exterior mirror assembly, such as is described in commonly assigned patent application Ser. No. 09/372,915, filed Aug. 12, 1999, now U.S. Pat. No. 6,396,397, the disclosure of which is hereby incorporated herein by reference, and further equipped with a CMOS camera-based headlamp controller as disclosed in commonly assigned U.S. Pat. Nos. 5,796,094 and 6,097,023, the disclosures of which are hereby incorporated herein by reference, and with the various image outputs being processed by the VPM. In this regard, should the vehicle be equipped with high intensity discharge (HID)/gas discharge headlamps (as known in the automotive lighting art), then the VPM can receive the output signal from a forward-facing CMOS camera (preferably mounted at or in the interior rearview mirror assembly and viewing oncoming headlights of approaching vehicles through the front windshield of the vehicle) and the VPM can control the intensity and/or direction of the light beam output from the HID headlamps as a function of the light level of the oncoming approaching headlamps as detected by the interior rearview mirror located forward-facing multipixel CMOS camera-on-a-chip light detector. Preferably, the intensity of the light beam output by the vehicle's HID lamps is inversely proportional to the intensity of the detected oncoming headlamps and, most preferably, the intensity of the HID headlamps is continuously variable inversely proportional to the intensity of the oncoming headlight intensity of approaching vehicles as detected by the forward-facing CMOS camera.

Further, and preferably, the vehicle may be equipped with a mobile cellular phone that is docked into a cell phone cradle system (such as in the CellPort 3000 system available from Cellport Systems Inc. of Boulder, Colo.) to allow a driver to conduct a hands-free telephone call when driving, and to provide the driver the option of undocking the cellular phone as desired in order to use the cellular phone, for example, when the driver departs the vehicle. The cell phone cradle system can include a sound-processing system (preferably including a microphone or microphone array, and such as is disclosed in commonly assigned patent application Ser. No. 09/466,010, filed Dec. 17, 1999, now U.S. Pat. No. 6,420,975, the disclosure of which is hereby incorporated herein by reference, and other accessories, and with the cell cradle providing outputs at least partially processed by the VPM.

The vehicle may also be equipped with a navigational system, such as a global positioning system, and with controls and/or functions of said navigational system being at least partially processed by VPM 14. For a vehicle equipped with a GPS system and with a cell phone cradle (such as the CellPort 3000 system), a control input can be provided in the interior of the vehicle (such as at or on the interior mirror assembly) and/or a voice command control system can be provided whereby when the control input and/or voice command is actuated, a call is initiated to an external service (such as an emergency service of a concierge service or an information service) located remote from the vehicle and wherein the location of the vehicle (as generated by the vehicular navigational system) is automatically transmitted to the external service so that the external service can know the location of the vehicle and so provide assistance, advice and/or directions, and the like, to the driver of that vehicle. Such communication of geographic positional data can be transmitted by telecommunication via a phone network (such as Sprint or MCI or ATT, or the like) in a voice-over-data format allowing the driver to have a conversation with the service provider (and/or with another party) concurrent with the transmission of the vehicle location information to the service provider via telephonic linkage via the docked cell phone (or, optionally, via a BLUETOOTH or similar short-range RF wireless link between a cellular phone in, for example, the pocket of a driver and a cell phone linking/telecommunication/telematic station located, for example, at an interior rearview mirror assembly of the vehicle or in a dashboard or console area of the vehicle) to the external service provider. Preferably, at least some of such processing is handled by VPM 14 and, in particular, when videoconferencing is used.

The present invention can be used in a lane change aid system such as disclosed in a commonly assigned provisional patent application Ser. No. 60/309,022 filed Jul. 31, 2001, and a utility patent application filed concurrently herewith by Schofield for an AUTOMOTIVE LANE CHANGE AID, now U.S. Pat. No. 6,882,287, the disclosures of which are hereby incorporated herein by reference.

Also, a night vision system camera (such as an infrared detecting microbolometer night vision camera or a CMOS/near-IR detecting camera used in conjunction with a near-IR laser source for illumination forward of the vehicle) and an intelligent headlamp controller (such as a forward-facing CMOS video camera that automatically detects approaching vehicles and that dims the headlights of the host vehicle in response) can have their outputs combined/fused in accordance with the present invention to identify objects hazardous to the driver, such as a deer crossing the road ahead of the vehicle as the vehicle travels down a dark road at night. The control can, in response, automatically activate one or both existing headlamps, for example, to flash them or to move from a low-beam state to a high-beam state or to activate an additional headlamp or fog lamp or to adjust headlamps to high beam so that the object may be illuminated for the driver. Current night vision systems may either provide too much information for the driver to usefully assimilate or may distract him/her from attention to the road. The above combination achieved via the fusion system of the present invention allows use of the night vision system/intelligent headlamp controller to automatically provide extra forward illumination at the time required for the driver to take action to avoid a problem, which is the real intent behind the night vision system in the first place. The fusion of these inputs into a single processor achieves optimized nighttime driving safety. Note that a single forward-facing camera can perform both the night vision and intelligent headlamp control functions.

VPM 14 may receive both wired inputs and wireless inputs. For example, a restricted-range RF wireless communication device such as a BLUETOOTH device (housed, for example within an inside mirror or housed elsewhere in the interior cabin such as in an overhead console or a facia/instrumentation panel) can be used as a convenient channel location for the programming or reprogramming of various types of radio-frequency (RF) devices in a vehicle and/or to facilitate the use of RF as a means to program or reprogram non-RF devices to provide drivers with a more complete personalization of a vehicle (e.g., trainable garage door open, memory seat/mirror position, outside mirror position, etc.). This can be used in, for example, rental cars where an RF signal can be provided (such as via an RF transmitter located in the interior mirror assembly or in a windshield electronic accessory module) from a personal display assistant device (PDA) such as a PalmPilot® PDA and thus provide a driver with immediate personalization to include temperature/climate control, radio setting, exterior mirror reflector position and other preferences.

In accordance with U.S. Pat. Nos. 5,949,331 and 6,222,447, incorporated by reference above, a display system of the equipped vehicle displays a synthesized image that visually informs the driver of what is occurring in the area surrounding the equipped vehicle. The displayed image is synthesized from the camera outputs and, preferably, approximates a substantially seamless panoramic view as would be viewed by a single virtual camera located exterior the equipped vehicle.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicular driver assist system suitable for use in a vehicle, said vehicular driver assist system comprising:
   a video processor module disposed at a vehicle equipped with said vehicular driver assist system;
   said video processor module receiving and processing image data provided by a plurality of video sensors disposed at the equipped vehicle;
   said video processor module receiving and processing sensor data provided by a plurality of non-video sensors disposed at the equipped vehicle;
   said plurality of video sensors comprising at least five vehicular cameras;
   said at least five vehicular cameras comprising a first vehicular camera disposed at a driver side of the equipped vehicle;
   said at least five vehicular cameras comprising a second vehicular camera disposed at a passenger side of the equipped vehicle;
   said at least five vehicular cameras comprising a third vehicular camera disposed at a rear portion of the equipped vehicle;
   said at least five vehicular cameras comprising a fourth vehicular camera disposed at a front portion of the equipped vehicle;
   said at least five vehicular cameras comprising a fifth vehicular camera disposed at, and viewing forwardly through, an in-cabin side of a windshield of the equipped vehicle;
   wherein said first vehicular camera has a first field of view exterior of the equipped vehicle and is operable to capture first image data;

wherein said second vehicular camera has a second field of view exterior of the equipped vehicle and is operable to capture second image data;

wherein said third vehicular camera has a third field of view exterior of the equipped vehicle and is operable to capture third image data;

wherein said fourth vehicular camera has a fourth field of view exterior of the equipped vehicle and is operable to capture fourth image data;

wherein said fifth vehicular camera has a fifth field of view exterior of the equipped vehicle and is operable to capture fifth image data;

wherein said first vehicular camera comprises a CMOS imaging sensor and wherein said second vehicular camera comprises a CMOS imaging sensor and wherein said third vehicular camera comprises a CMOS imaging sensor and wherein said fourth vehicular camera comprises a CMOS imaging sensor and wherein said fifth vehicular camera comprises a CMOS imaging sensor;

said plurality of non-video sensors comprising at least one non-video sensor selected from the group consisting of a radar sensor, a near-infrared sensor, a far-infrared sensor, a thermal sensor and a sonar sensor;

wherein said video processor module receives first image data captured by said first vehicular camera;

wherein said video processor module receives second image data captured by said second vehicular camera;

wherein said video processor module receives third image data captured by said third vehicular camera;

wherein said video processor module receives fourth image data captured by said fourth vehicular camera;

wherein said video processor module receives fifth image data captured by said fifth vehicular camera;

wherein said video processor module receives sensor data captured by said plurality of non-video sensors;

wherein said video processor module communicates with other vehicle systems via a vehicle bus of the equipped vehicle;

wherein received image data is processed at said video processor module to generate a synthesized image;

wherein said synthesized image is output from said video processor module for display by a single display screen of a display device of the equipped vehicle that is viewable by a driver of the equipped vehicle when normally operating the equipped vehicle;

wherein said synthesized image displayed by said display screen approximates a view as would be viewed from a single virtual camera located exterior the equipped vehicle; and wherein, responsive at least in part to processing of image data and sensor data at said video processor module, a driver assistance system of the equipped vehicle is controlled.

2. The driver assist system of claim 1, wherein said video processor module receives first image data captured by said first vehicular camera at a first interface, and wherein said video processor module receives second image data captured by said second vehicular camera at a second interface, and wherein said video processor module receives third image data captured by said third vehicular camera at a third interface, and wherein said video processor module receives fourth image data captured by said fourth vehicular camera at a fourth, and wherein said video processor module receives fifth image data captured by said fifth vehicular camera at a fifth interface.

3. The driver assist system of claim 2, wherein said video processor module comprises at least one non-video sensor interface configured for communication with said at least one non-video sensor of said plurality of non-video sensors.

4. The driver assist system of claim 1, wherein said synthesized image displayed by said display screen is algorithmically stabilized at said video processor module.

5. The driver assist system of claim 4, wherein said first vehicular camera is disposed at a driver-side exterior mirror assembly at the driver side of the equipped vehicle and wherein said second vehicular camera is disposed at a passenger-side exterior mirror assembly at the passenger side of the equipped vehicle.

6. The driver assist system of claim 1, wherein objects external to the equipped vehicle are tracked based at least in part on processing of captured image data and sensed sensor data at said video processor module.

7. The driver assist system of claim 1, wherein an object external to the equipped vehicle is detected, at least in part, via processing of image data at said video processor module.

8. The driver assist system of claim 7, wherein position of the object external the equipped vehicle is detected, at least in part, via processing of image data at said video processor module.

9. The driver assist system of claim 1, wherein said synthesized image displayed by said display screen approximates a panoramic view as would be viewed from a single virtual camera located exterior the equipped vehicle.

10. The driver assist system of claim 1, wherein said video processor module communicates with other vehicle systems via a CAN vehicle bus of the equipped vehicle.

11. The driver assist system of claim 1, wherein said video processor module comprises a video processor chip.

12. The driver assist system of claim 11, wherein image data captured by said fifth vehicular camera is processed at said video processor module for an automatic headlamp controller of the equipped vehicle.

13. The driver assist system of claim 11, wherein image data captured by said fifth vehicular camera is processed at said video processor module for a lane departure warning system of the equipped vehicle.

14. The driver assist system of claim 1, wherein said plurality of non-video sensors comprises a plurality of radar sensors disposed at the equipped vehicle and wherein said radar sensors are operable to sense radar data.

15. The driver assist system of claim 14, wherein said video processor module receives radar data sensed by said plurality of radar sensors and wherein received image data is processed with received radar data at said video processor module and wherein, responsive at least in part to processing of image data and radar data at said video processor module, said driver assistance system of the equipped vehicle is controlled.

16. The driver assist system of claim 15, wherein objects external to the equipped vehicle are tracked based at least in part on processing of captured image data and sensed radar data at said video processor module.

17. The driver assist system of claim 1, wherein said at least one non-video sensor of said plurality of non-video sensors comprises a radar sensor, and wherein an object external to the equipped vehicle is detected, at least in part, via processing of image data at said video processor module.

18. The driver assist system of claim 17, wherein said video processor module comprises a non-video sensor interface configured for communication with the radar sensor.

19. The driver assist system of claim 17, wherein said video processor module communicates with other vehicle systems via a CAN vehicle bus of the equipped vehicle.

20. The driver assist system of claim 19, wherein said synthesized image displayed by said display screen approximates a panoramic view as would be viewed from a single virtual camera located exterior the equipped vehicle.

21. The driver assist system of claim 20, wherein said third vehicular camera disposed at the rear portion of the equipped vehicle is located at or proximate to a longitudinal centerline of the equipped vehicle, and wherein said fourth vehicular camera disposed at the front portion of the equipped vehicle is located at or proximate to the longitudinal centerline of the equipped vehicle.

22. The driver assist system of claim 1, wherein said plurality of video sensors comprises at least eight vehicular cameras.

23. The driver assist system of claim 1, wherein data processing at said video processor module comprises object tracking of objects that are identified and classified by an object classifier.

24. The driver assist system of claim 1, wherein data processing at said video processor module comprises generation of on-screen display signals for generating on-screen displays at said display screen.

25. The driver assist system of claim 1, wherein data processing at said video processor module comprises performance of diagnostics.

26. The driver assist system of claim 1, wherein said driver assistance system of the equipped vehicle comprises an adaptive speed control system of the equipped vehicle.

27. The driver assist system of claim 1, wherein said driver assistance system of the equipped vehicle comprises a crash warning system of the equipped vehicle.

28. The driver assist system of claim 1, wherein said driver assistance system of the equipped vehicle comprises a blind spot detection system of the equipped vehicle.

29. The driver assist system of claim 1, wherein said driver assistance system of the equipped vehicle comprises a lane change aid system of the equipped vehicle.

30. The driver assist system of claim 1, wherein said driver assistance system of the equipped vehicle comprises a reverse aid warning system of the equipped vehicle.

31. The driver assist system of claim 1, wherein said driver assistance system of the equipped vehicle comprises a side object detection system of the equipped vehicle.

32. The driver assist system of claim 1, wherein said video processor module comprises a plurality of video sensor electronic interfaces for receiving image data output respectively from individual ones of said plurality of video sensors.

33. The driver assist system of claim 32, wherein image data is received at at least some of said plurality of video sensor electronic interfaces in accordance with a standard data protocol.

34. The driver assist system of claim 33, wherein said standard data protocol comprises a J1394 Firewire protocol.

35. The driver assist system of claim 32, wherein said video processor module comprises a video processor chip, a power supply and memory.

36. A vehicular driver assist system suitable for use in a vehicle, said vehicular driver assist system comprising:

a video processor module disposed at a vehicle equipped with said vehicular driver assist system;

said video processor module receiving and processing image data provided by a plurality of video sensors disposed at the equipped vehicle;

said video processor module receiving and processing sensor data provided by a plurality of radar sensors disposed at the equipped vehicle;

said plurality of video sensors comprising at least five vehicular cameras;

said at least five vehicular cameras comprising a first vehicular camera disposed at a driver side of the equipped vehicle;

said at least five vehicular cameras comprising a second vehicular camera disposed at a passenger side of the equipped vehicle;

said at least five vehicular cameras comprising a third vehicular camera disposed at a rear portion of the equipped vehicle;

said at least five vehicular cameras comprising a fourth vehicular camera disposed at a front portion of the equipped vehicle;

said at least five vehicular cameras comprising a fifth vehicular camera disposed at, and viewing forwardly through, an in-cabin side of a windshield of the equipped vehicle;

wherein said first vehicular camera has a first field of view exterior of the equipped vehicle and is operable to capture first image data;

wherein said second vehicular camera has a second field of view exterior of the equipped vehicle and is operable to capture second image data;

wherein said third vehicular camera has a third field of view exterior of the equipped vehicle and is operable to capture third image data;

wherein said fourth vehicular camera has a fourth field of view exterior of the equipped vehicle and is operable to capture fourth image data;

wherein said fifth vehicular camera has a fifth field of view exterior of the equipped vehicle and is operable to capture fifth image data;

wherein said third vehicular camera disposed at the rear portion of the equipped vehicle is located at or proximate to a longitudinal centerline of the equipped vehicle;

wherein said fourth vehicular camera disposed at the front portion of the equipped vehicle is located at or proximate to the longitudinal centerline of the equipped vehicle;

wherein said first vehicular camera comprises a CMOS imaging sensor and wherein said second vehicular camera comprises a CMOS imaging sensor and wherein said third vehicular camera comprises a CMOS imaging sensor and wherein said fourth vehicular camera comprises a CMOS imaging sensor and wherein said fifth vehicular camera comprises a CMOS imaging sensor;

wherein said video processor module receives first image data captured by said first vehicular camera;

wherein said video processor module receives second image data captured by said second vehicular camera;

wherein said video processor module receives third image data captured by said third vehicular camera;

wherein said video processor module receives fourth image data captured by said fourth vehicular camera;

wherein said video processor module receives fifth image data captured by said fifth vehicular camera;

wherein said video processor module receives sensor data captured by said radar sensors;

wherein an object external to the equipped vehicle is detected, at least in part, via processing of image data at said video processor module;

wherein the detected object external to the equipped vehicle is tracked based at least in part on processing of captured image data and sensed sensor data at said video processor module; and wherein, responsive at least in part to processing of image data and sensor data at said video processor module, a driver assistance system of the equipped vehicle is controlled.

37. The driver assist system of claim 36, wherein image data captured by said fifth vehicular camera is processed at said video processor module for at least one of (i) an automatic headlamp controller of the equipped vehicle and (ii) a lane departure warning system of the equipped vehicle.

38. The driver assist system of claim 36, wherein data processing at said video processor module comprises object tracking of objects that are identified and classified by an object classifier.

39. The driver assist system of claim 36, wherein data processing at said video processor module comprises performance of diagnostics.

40. The driver assist system of claim 36, wherein said driver assistance system of the equipped vehicle comprises at least one of (i) an adaptive speed control system of the equipped vehicle, (ii) a crash warning system of the equipped vehicle, (iii) a blind spot detection system of the equipped vehicle, (iv) a lane change aid system of the equipped vehicle, (v) a reverse aid warning system of the equipped vehicle and (vi) a side object detection system of the equipped vehicle.

41. The driver assist system of claim 40, wherein said video processor module communicates with other vehicle systems via a vehicle bus of the equipped vehicle and wherein said video processor module comprises a power supply and memory.

42. The driver assist system of claim 41, wherein received image data is processed at said video processor module to generate a synthesized image, and wherein said synthesized image is output from said video processor module for display by a single display screen of a display device of the equipped vehicle that is viewable by a driver of the equipped vehicle when normally operating the equipped vehicle, and wherein said synthesized image displayed by said display screen approximates a panoramic view as would be viewed from a single virtual camera located exterior the equipped vehicle.

43. A vehicular driver assist system suitable for use in a vehicle, said vehicular driver assist system comprising:

a video processor module disposed at a vehicle equipped with said vehicular driver assist system;

said video processor module receiving and processing image data provided by a plurality of video sensors disposed at the equipped vehicle;

said video processor module receiving and processing sensor data provided by a plurality of radar sensors disposed at the equipped vehicle;

said plurality of video sensors comprising at least five vehicular cameras;

said at least five vehicular cameras comprising a first vehicular camera disposed at a driver side of the equipped vehicle;

said at least five vehicular cameras comprising a second vehicular camera disposed at a passenger side of the equipped vehicle;

said at least five vehicular cameras comprising a third vehicular camera disposed at a rear portion of the equipped vehicle;

said at least five vehicular cameras comprising a fourth vehicular camera disposed at a front portion of the equipped vehicle;

said at least five vehicular cameras comprising a fifth vehicular camera disposed at, and viewing forwardly through, an in-cabin side of a windshield of the equipped vehicle;

wherein said first vehicular camera has a first field of view exterior of the equipped vehicle and is operable to capture first image data;

wherein said second vehicular camera has a second field of view exterior of the equipped vehicle and is operable to capture second image data;

wherein said third vehicular camera has a third field of view exterior of the equipped vehicle and is operable to capture third image data;

wherein said fourth vehicular camera has a fourth field of view exterior of the equipped vehicle and is operable to capture fourth image data;

wherein said fifth vehicular camera has a fifth field of view exterior of the equipped vehicle and is operable to capture fifth image data;

wherein said third vehicular camera disposed at the rear portion of the equipped vehicle is located at or proximate to a longitudinal centerline of the equipped vehicle;

wherein said fourth vehicular camera disposed at the front portion of the equipped vehicle is located at or proximate to the longitudinal centerline of the equipped vehicle;

wherein said video processor module receives first image data captured by said first vehicular camera;

wherein said video processor module receives second image data captured by said second vehicular camera;

wherein said video processor module receives third image data captured by said third vehicular camera;

wherein said video processor module receives fourth image data captured by said fourth vehicular camera;

wherein said video processor module receives fifth image data captured by said fifth vehicular camera;

wherein said video processor module receives sensor data captured by said radar sensors;

wherein an object external to the equipped vehicle is detected, at least in part, via processing of image data at said video processor module;

wherein the detected objects external to the equipped vehicle is tracked based at least in part on processing of captured image data and sensed sensor data at said video processor module;

wherein image data captured by said fifth vehicular camera is processed at said video processor module for at least one of (i) an automatic headlamp controller of the equipped vehicle and (ii) a lane departure warning system of the equipped vehicle;

wherein, responsive at least in part to processing of image data and sensor data at said video processor module, a driver assistance system of the equipped vehicle is controlled; and wherein said driver assistance system of the equipped vehicle comprises at least one of (i) an adaptive speed control system of the equipped vehicle, (ii) a crash warning system of the equipped vehicle, (iii) a blind spot detection system of the equipped vehicle, (iv) a lane change aid system of the equipped vehicle, (v) a reverse aid warning system of the equipped vehicle and (vi) a side object detection system of the equipped vehicle.

44. The driver assist system of claim 43, wherein said video processor module communicates with other vehicle systems via a vehicle bus of the equipped vehicle and wherein said video processor module comprises a power supply and memory.

45. The driver assist system of claim 43, wherein said first vehicular camera comprises a CMOS imaging sensor and wherein said second vehicular camera comprises a CMOS imaging sensor and wherein said third vehicular camera comprises a CMOS imaging sensor and wherein said fourth vehicular camera comprises a CMOS imaging sensor and wherein said fifth vehicular camera comprises a CMOS imaging sensor.

46. The driver assist system of claim 45, wherein received image data is processed at said video processor module to generate a synthesized image, and wherein said synthesized image is output from said video processor module for display by a single display screen of a display device of the equipped vehicle that is viewable by a driver of the equipped vehicle when normally operating the equipped vehicle, and wherein said synthesized image displayed by said display screen approximates a panoramic view as would be viewed from a single virtual camera located exterior the equipped vehicle.

* * * * *